United States Patent Office 2,934,548
Patented Apr. 26, 1960

2,934,548

BIMETALLIC ORGANIC COMPOUNDS AND COMPOSITIONS CONTAINING SAME

Joseph Fath, Morristown, N.J., assignor, by mesne assignments, to Heyden Newport Chemical Corporation, a corporation of Delaware No Drawing. Application August 25, 1954
Serial No. 452,209

29 Claims. (Cl. 260—429.7)

This invention relates to novel bimetallic organic compounds and compositions upon which they render a beneficial stabilizing effect when contained therein. More particularly, the compositions so affected are polymeric resin compositions of which polyvinyl chloride and polyvinyl chloride containing resins form the largest single part.

The problems encountered in preventing the degradation by heat of these polymers during processing and during the life of the article of commerce derived therefrom with respect to discoloration as well as to deterioration by constant exposure to light have been approached in many ways.

The most common means of protecting these polymers against the effects of light and heat is to incorporate therein stabilizers in the form of metal soaps, such as cadmium laurate, barium laurate, lead stearate, etc. or organo-metallic type compositions, such as dibutyl tin dilaurate. The metal soaps cannot be used in all vinyl chloride containing resins due to limitations of special properties required. The organo-metallic compounds, as illustrated by dibutyl tin dilaurate, have special application to those resin compositions as require great clarity and stability to light. Moreover, the organo-metallic tin compounds generally function more effectively than metal soaps. The metal soaps are cheaper than the organo-metallic compounds but, in order to obtain through their use results which approach those obtainable through the use of organo tin compounds, a high level of the soap is required, which overcomes the cost advantage and also defeats the purpose because of the fact that the clarity of the film and other physical properties are adversely affected by inclusion of high amounts of such soaps.

For the reasons stated, the organo-tin compounds are preferred in many instances because of their high degree of performance. However, they are expensive materials and many attempts have been made to find equally good stabilizers of lower cost.

I have conceived, as a result of prolonged experimentation and research, a new product which fulfills these requirements. It has the advantages of the organo-tin compounds while being greatly superior in its protective effect upon polymeric resin compositions in which it is incorporated and materially reduces the cost of the stabilizing component of such compositions.

The product of this invention may be referred to generally as a multiple salt of tin and antimony and is produced through reactions in which both the tin and the antimony are attached to a nucleus consisting of an organic residue by replacement of two hydrogen atoms. The other valences of the tin and the antimony are taken up either by direct linkage to a carbon atom of an organic residue or by replacement of hydrogen atoms of an organic residue, as may be desired.

Compounds embodying the present invention contain the general grouping:

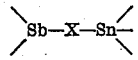

wherein X is derived from the compound H—X—H which in turn is defined as a difunctional molecule having two replaceable hydrogen atoms.

Examples of difunctional compounds of the general structure H—X—H are the dibasic acids, diphenols, mercapto acids and hydroxy acids. Specific compounds included within this group are:

Sebacic acid
Azealeic acid
Adipic acid
Phthalic acid
Succinic acid
Malic acid
Fumaric acid
Dodecenyl succinic acid
Octenyl succinic acid
Octadecyl succinic acid
Resorcinol
Catechol
Thioglycolic acid
Thiomalic acid monobutyl ester
Sulfosuccinic acid monoctyl ester
Maleic acid thioethyl ester Compounds containing the group described above are of the general configuration:

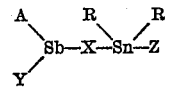

wherein A, Y and Z are selected from the group consisting of alkyloxy, aryloxy, alkaryloxy, acyloxy, alkylthioacylate, alkylthio, arylthio and alkarylthio radicals. Specific examples of H—A, H—Y and H—Z from which this group is derived are 2-ethylhexanol, phenol, nonyl phenol, xylenol, 2-ethylhexoic acid, oleic acid, lauric acid, 2-ethyl 3-propylacrylic acid, lauryl mercaptan, isooctylthioglycolate, dibutylthiomalate, cyclohexylbetathiobutyrate, thiophenol, thiocresol, etc. R is defined as belonging to the group consisting of alkyl, aryl, aralkyl, and alkenyl radicals. Specific examples of R are methyl, ethyl butyl, dodecenyl, phenyl, xylyl groups. In certain cases R and A, Y or Z may be used interchangeably.

Compounds embodying the present invention are shown in the table below. They are advanced as illustrated and not by way of limitation.

TABLE I

| Compound | Name |
|---|---|
| I | Mono (dibutyl tin monothioglycolic acid isooctyl ester) mono (antimony di-2-ethyl hexoate) dodecenyl succinate 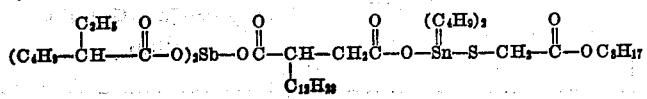 |

TABLE I—Continued

| Compound | Name |
|---|---|
| II | Mono (diphenyl tin monothiomalic acid dibutyl ester) mono (antimony di-xylenate) octenyl succinate |
| III | Mono (dixylyl tin monolauryl mercaptide) mono (antimony monodecylate mono oleate) sebacate |
| IV | Mono (dioctenyl tin monoxylenate) mono (antimony monothiocresylate monophenate) catecholate |
| V | Mono (diethyl tin monolaurate) mono (antimony monothiophenate monothioglycolic acid hexylester) adipate |
| VI | Mono (dibutyl tin monothiocresylate) mono (antimony mononoylphenate monoparatertiary butyl benzoate) thioglycolate |
| VII | Mono (dibutyl tin monoepoxy stearate) mono (antimony dioctoate) octadecyl succinate |
| VIII | Mono (dimethyl tin monopalmitate) mono (antimony monolaurate monothiocresylate) resorcylate |

The compounds shown in the above table may be employed in halogen containing polymeric compositions, such as polyvinyl chloride, from which finished goods may be prepared by milling, extrusion, coating, molding and the like.

In order to demonstrate the efficacy of the compounds of this invention as stabilizers, a number of tests were carried out incorporating my compounds in a number of vinyl resins. Polyvinyl chloride films were prepared by milling, and the milled sheets were heat tested. The following specific example is typical of the procedures employed.

From 0.1 to 3 parts of my multiple salt stabilizer were incorporated into a mixture consisting of 100 parts by weight of resin, 35-50 parts by weight of plasticizer or a mixture of plasticizers. The mixture was thoroughly blended until considered uniform and then milled for five minutes on a 2 roll differential speed mill heated to 320-330° F. A sheet was then removed from the mill and permitted to cool. 1 x 1 inch squares were cut out of the sheet at sample locations, placed on a flat glass plate and kept in a mechanical convection oven at 350° F. Sample squares were removed at 15, 30, 45, 60 and 120 minute periods. They were rated visually according to the amount of discoloration they exhibited. For purposes of color comparison, which was considered a measure of stabilizing efficiency, the following color rating scale was adopted. A rating of 1 denoted no color, 3 denoted slight yellowing, 5 denoted yellowing, 7 denoted amber and 9 denoted black. Intermediate numbers denoted colors of intermediate shades.

A summary of the performance of some of the compounds of Table I and the compositions in which they were used is given in Table II.

TABLE II

| Compound No. | Resin [1] | Plasticizer [2] | Color Rating After— | | | | |
|---|---|---|---|---|---|---|---|
| | | | 15 Min. | 30 Min. | 45 Min. | 60 Min. | 120 Min. |
| I. 1 part | Geon 101 EP (Goodrich), 100 parts. | Dioctyl Phthalate, 50 parts | 1 | 1 | 1 | 2 | 3 |
| II. 1.5 parts | VYNW (Bakelite), 100 parts. | Dioctyl Phthalate, 45 parts, G-62, 5 parts (Rohm & Haas). | 1 | 1 | 1 | 1.5 | 2 |
| V. 2 parts | Marvinol V-R-20 (Naugatuck), 100 parts. | Dioctyl Phthalate, 25 parts, Dioctyl sebacate, 25 parts. | 1 | 1 | 1 | 1.5 | 2 |
| VIII. 1 part | Geon 101 EP, 100 parts | Dioctyl Phthalate, 22 parts, G-62, 5 parts, Tricresyl Phosphate, 8 parts, 4GO (Carbon and Carbide), 8 parts. | 1 | 1 | 2 | 2 | 3 |
| None | Geon 101 EP, 100 parts | Dioctyl Phthalate, 50 parts | 9 | 9 | 9 | 9 | 9 |

[1] Resin—Geon 101 EP, VYNW, Marvinol VR-20, are modified polyvinyl chloride resin powders manufactured by the above mentioned companies.
[2] Plasticizer—G-62 is an epoxidized polymeric plasticizer manufactured by Rohm & Haas; 4GO is tetraethylene glycol di-2-ethylhexoate manufactured by Carbide and Carbon.

The milled sheets produced by the incorporation of my compounds are not only extremely resistant to discoloration by heat, as Table II so clearly demonstrates, but are also noted for their extreme clarity, brilliance, lack of bloom and good lubricity. These novel compounds, therefore, impart a number of extremely desirable properties to polyvinyl chloride resin compositions, thus making them valuable adjuncts to the vinyl processor.

My multiple salts may be prepared by various methods of which the two following are illustrative. These methods, using the same symbols as have heretofore been designated, may be represented by the following series of chemical equations:

Method A (1)
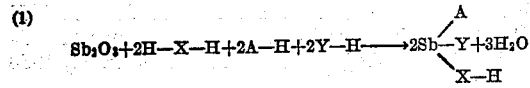

(2)
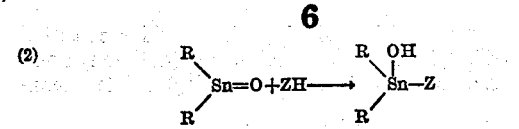

(3)
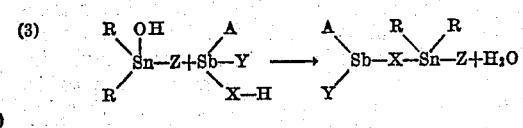

Method B (1)
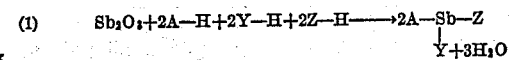

(2)
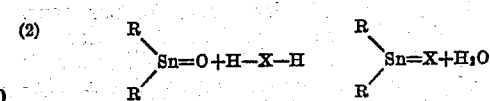

(3)
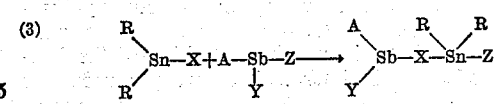

Either of the above methods yields the desired end product of definite chemical constitution.

The following specific examples are in accordance with these procedures.

EXAMPLE I

Into a two liter 3-neck flask equipped with agitator, thermometer, reflux condenser and Dean Stark tube were introduced 204 grams 2-ethylhexyl thioglycolate (1 mol), 145 grams 2-ethylhexoic acid (1 mol), 202 grams sebacic acid (1 mol), 161 grams of antimony oxide (0.55 mol $Sb_2O_3$) and 50 cc. xylene. The slurry was heated and agitated at 180° C.–200° C. under continuous reflux. When 27 cc. water had been collected and no further amount of water was eliminated, the reaction was discontinued and the mixture filtered from a small amount of unreacted antimony oxide.

Into another 2 liter 3 neck flask equipped with stirrer, thermometer and reflux condenser were charged 252 grams dibutyl tin oxide and 280 grams oleic acid. The mixture was heated to 160° C. and the temperature was maintained for ½ hour. Thereupon the filtrate from the first part of this reaction was added and azeotropic refluxing was begun until an additional 18 cc. of water had been collected. Upon completion of the reaction, excess xylene was removed by stripping. The residue consisted of mono(dibutyl tin mono-oleate) mono (antimony nono 2-ethyl hexoate mono 2-ethylhexyl thioglycolate) sebacate.

EXAMPLE II

Into a two liter 3-neck flask equipped with agitator, thermometer, reflux condenser and Dean-Stark tube were introduced 400 grams lauric acid, 262 grams dibutyl thiomalate, 100 cc. xylene and 161 grams of antimony oxide. The mixture was heated to 180° C.–280° C. with agitation and refluxed at this temperature. Upon the elimination of 27 cc. water, the reaction was discontinued and the mixture filtered to produce a clear solution.

In a 1500 cc. beaker were placed 278 grams of dodecenyl succinic anhydride and 252 grams dibutyl tin oxide. The mixture was heated on a hot plate, with agitation, to 150° C. and maintained there for one hour. Following this, it was added to the clear filtrate prepared above and the mixture was placed in a 2 liter 3-neck flask equipped with agitator and distilling condenser. Xylene was removed from the solution under vacuum. The residue consisted of mono (dibutyl tin monodibutyl thiomalate) mono (antimony dilaurate) dodecenyl succinate.

It will be noted that in carrying out either of the foregoing methods, certain intermediates are produced. It is of course advantageous to separate the pure compound from the intermediates for use as a stabilizer. However, there is a considerable advantage chemically if such a purification procedure can be eliminated and I have found that when minor amounts of the intermediates are present together with the multiple salt, the performance and effectiveness of the multiple salt remains apparently unchanged. This may be due to a certain synergistic action which these intermediates evince when present with the multiple salts of this invention. Experience has shown, however, that these intermediates, when employed individually as stabilizers in vinyl halogen containing resins, show stabilizing activity only to a minor extent when present in amounts in which they are used to form compounds of the present invention.

The novel compounds of this invention have been hereinbefore described in connection with their primarily intended use in halogen containing vinyl polymers. They may moreover be used as stabilizers for other chlorinated materials, rubber anti-oxidants, lube oil additive and the like.

In the course of my research which resulted in the production of the multiple salts of this invention, numerous tests were carried out to determine the effectiveness of a simple mixture of a conventional organo tin stabilizer and an antimony salt. I have found that such a mixture had some stabilizing effect in some polymer compounds, but this effect was in nowise comparable to the remarkable results obtained by the multiple salts of this invention. However, I consider such a mixture as a much less efficient alternative to the double salt and as constituing a separate invention on my part.

The foregoing detailed description sets forth the invention in its preferred practical forms, but the invention is to be understood as fully commensurate with the appended claims.

Having thus fully described the invention, what I claim as new and desire to secure by Letters Patent is:

1. A compound of the general formula

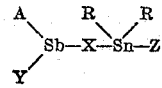

wherein X is selected from the group consisting of hydrocarbo dibasic carboxylic acids, phenols, and mercapto acids, wherein antimony and tin are each linked to X by replacement of a single hydrogen atom, wherein R is selected from the group consisting of alkyl, aryl, and alkaryl radicals, and A, Y and Z are selected from the group consisting of alkoxy, aryloxy, alkaryloxy, acyloxy, alkylthioacylate, alkylthio, arylthio and alkarylthio groups.

2. A compound according to claim 1, wherein X is the dodecenyl succinic acid radical.
3. A compound according to claim 1, wherein X is the octenyl succinic acid radical.
4. A compound according to claim 1, wherein X is the sebacic acid radical.
5. A compound according to claim 1, wherein X is the catechoxy radical.
6. A compound according to claim 1, wherein X is the thiomalic acid monobutyl ester radical.
7. A compound according to claim 1, wherein R comprises a butyl group.
8. A compound according to claim 1, wherein R comprises a xylyl group.
9. A compound according to claim 1, wherein R comprises an ethyl group.
10. A compound according to claim 1, wherein R comprises a phenyl group.
11. A compound according to claim 1, wherein R comprises a methyl group.
12. A compound according to claim 1, wherein A is the 2-ethylhexoic acid radical.
13. A compound according to claim 1, wherein A is the thioglycolic acid isooctyl ester radical.
14. A compound according to claim 1, wherein A is the thiocresoxy radical.
15. A compound according to claim 1, wherein A is the laurylmercaptyl radical.
16. A compound according to claim 1, wherein A is the nonylphenoxy radical.
17. A compound according to claim 1, wherein Y is the oleic acid radical.
18. A compound according to claim 1, wherein Y is the thiophenoxy radical.
19. A compound according to claim 1, wherein Y is the thioglycolic acid hexylester radical.
20. A compound according to claim 1, wherein Y is the phenoxy radical.
21. A compound according to claim 1, wherein Y is the 2-butyloctanoxy radical.
22. A compound according to claim 1, wherein Z is the thioglycolic acid isooctyl ester radical.
23. A compound according to claim 1, wherein Z is the thiomalic acid dibutyl ester radical.
24. A compound according to claim 1, wherein Z is the monolauryl mercaptyl radical.
25. A compound according to claim 1, wherein Z is the xylenoxy radical.
26. A compound according to claim 1, wherein Z is the lauric acid radical.
27. A compound according to claim 1, where X is the dodecenyl succinic acid radical, R is a butyl group, A is the 2-ethylhexoic acid radical, Y is the 2-ethylhexoic acid radical, and Z is the thioglycolic acid isooctyl ester radical.
28. A compound according to claim 1, wherein X is the dodecenyl succinic acid radical, R is a butyl group, A is the 2-ethylhexoic acid radical, Y is the xylenoxy radical, and Z is the thiomalic acid dibutyl ester radical.
29. A compound according to claim 1, wherein A, Y and Z are each thiomalic acid tridecyl ester radicals.

References Cited in the file of this patent
UNITED STATES PATENTS

| | | |
|---|---|---|
| 2,066,742 | Schmidt | Jan. 5, 1937 |
| 2,226,530 | Brown et al. | Dec. 31, 1940 |
| 2,461,531 | Cox et al. | Feb. 15, 1949 |
| 2,556,420 | Fincke | June 12, 1951 |
| 2,581,931 | Albert | Jan. 8, 1952 |
| 2,641,588 | Leistner et al. | June 9, 1953 |
| 2,680,726 | Weinberg | June 8, 1954 |
| 2,826,597 | Gloskey | Mar. 11, 1958 |